(12) United States Patent
Licciardello et al.

(10) Patent No.: US 7,416,115 B2
(45) Date of Patent: Aug. 26, 2008

(54) METHOD AND SYSTEM FOR AUTOMATED VALUE TRANSFER

(75) Inventors: Donald C. Licciardello, Pennington, NJ (US); Lawrence Greenberg, Newtown, PA (US); Alex Peterhans, Skillman, NJ (US); David Romero, Los Angeles, CA (US); Debra Lynn Licciardello, Pennington, NJ (US)

(73) Assignees: American Cash Exchange, L.L.C., Pennington, NJ (US); American Cash Exchange, Inc., Pennington, NJ (US)

( * ) Notice: Subject to any disclaimer, the term of this patent is extended or adjusted under 35 U.S.C. 154(b) by 0 days.

(21) Appl. No.: 11/203,301

(22) Filed: Aug. 15, 2005

(65) Prior Publication Data

US 2005/0269415 A1 Dec. 8, 2005

Related U.S. Application Data

(62) Division of application No. 10/654,603, filed on Sep. 4, 2003, now Pat. No. 7,195,151.

(60) Provisional application No. 60/449,398, filed on Feb. 25, 2003.

(51) Int. Cl.
*G06K 5/00* (2006.01)
*G06F 17/00* (2006.01)
*G07F 19/00* (2006.01)
*G06Q 20/00* (2006.01)

(52) U.S. Cl. .................. 235/380; 235/375; 235/379; 705/16; 705/17

(58) Field of Classification Search .............. 235/375, 235/379, 380; 705/16, 17, 35, 39
See application file for complete search history.

(56) References Cited

U.S. PATENT DOCUMENTS

| | | |
|---|---|---|
| 5,175,416 A | 12/1992 | Manssvelt et al. |
| 5,287,268 A * | 2/1994 | McCarthy ............... 705/14 |
| 5,504,677 A | 4/1996 | Pollin |
| 5,546,523 A | 8/1996 | Gatto |
| 5,650,604 A | 7/1997 | Marcous et al. |
| 5,744,787 A | 4/1998 | Teicher |
| 5,844,218 A | 12/1998 | Kawan et al. |
| 5,936,221 A | 8/1999 | Corder et al. |
| 5,937,396 A | 8/1999 | Konya |
| 5,963,547 A | 10/1999 | Downing et al. |
| RE36,365 E | 11/1999 | Levine et al. |

(Continued)

*Primary Examiner*—Steven S Paik
*Assistant Examiner*—April A Taylor
(74) *Attorney, Agent, or Firm*—Covington & Burling LLC

(57) ABSTRACT

This invention provides a system and method for authorizing automated value transfers from an account available to users who do not have a pre-existing trust, business or financial relationship. In an embodiment of the present invention, a Sender at a first location purchases a PIN Card at a point of sale, such as a retail location or a bank teller. The Sender contacts an intended Recipient at a remote location and discloses a Transfer PIN associated with the PIN Card, as well as the amount being transferred, to that intended Recipient. The Recipient needs only the Transfer PIN and a Cash Card to receive the money transfer at a participating remote location. To receive the value associated with the PIN Card, the Recipient inserts or swipes the Cash Card at an ATM and enters the Transfer PIN. An authorization system then authorizes the dispensing unit to dispense that value amount.

10 Claims, 13 Drawing Sheets

U.S. PATENT DOCUMENTS

| | | | |
|---|---|---|---|
| 6,045,039 | A | 4/2000 | Stinson et al. |
| 6,076,075 | A | 6/2000 | Teicher |
| RE36,788 | E | 7/2000 | Mansvelt |
| 6,098,053 | A | 8/2000 | Slater |
| 6,149,055 | A | 11/2000 | Gatto |
| RE37,122 | E | 4/2001 | Levine et al. |
| 6,302,326 | B1 | 10/2001 | Symonds |
| 6,315,195 | B1 | 11/2001 | Ramachandran |
| 6,317,745 | B1 | 11/2001 | Thomas et al. |
| 6,424,706 | B1 | 7/2002 | Katz et al. |
| 6,488,203 | B1 | 12/2002 | Stoutenburg et al. |
| 6,510,983 | B2 | 1/2003 | Horowitz et al. |
| 6,736,314 | B2 | 5/2004 | Cooper et al. |
| 6,834,796 | B2 | 12/2004 | Anvekar et al. |
| 2001/0034682 | A1 | 10/2001 | Knight et al. |
| 2002/0016763 | A1 | 2/2002 | March |
| 2002/0035539 | A1 | 3/2002 | O'Connell |
| 2002/0062285 | A1 | 5/2002 | Amann et al. |
| 2002/0065666 | A1 | 5/2002 | Zorrila De San Martin Soto |
| 2002/0077971 | A1 | 6/2002 | Allred |
| 2002/0082962 | A1 | 6/2002 | Farris et al. |
| 2002/0087462 | A1 | 7/2002 | Seifert et al. |
| 2002/0128967 | A1 | 9/2002 | Meyer |
| 2002/0152124 | A1 | 10/2002 | Guzman et al. |
| 2002/0152168 | A1 | 10/2002 | Neofytides et al. |
| 2002/0153414 | A1 | 10/2002 | Stoutenburg et al. |
| 2002/0194080 | A1 | 12/2002 | Louric |
| 2002/0195486 | A1* | 12/2002 | Erb et al. .................... 235/379 |

* cited by examiner

METHOD AND SYSTEM FOR AUTOMATED VALUE TRANSFER

RELATED APPLICATIONS

This application claims priority from U.S. Provisional Patent Application No. 60/449,398, titled "Method and System for Automated Value Transfer," filed Feb. 25, 2003, the entirety of which is hereby incorporated by reference.

FIELD OF THE INVENTION

The present invention relates generally to the field of electronic transfer of funds, and, more specifically, to a system and method for authorizing automated value transfers from an account available to users who do not have a pre-existing trust, business or financial relationship.

BACKGROUND OF THE INVENTION

As long ago as when people began interacting with others in far-off locations, there has been a need for transferring money to relatively remote locations. As electronic communications became increasingly prevalent, "money wiring" was developed to transfer money rapidly to distant locations. Today, people continue to find the need to send or receive money rapidly, in situations ranging from a parent sending money to a child away at college to a tourist in need of money in a foreign country after having a wallet or purse stolen. However, one drawback of conventional money wiring services is that they typically require a direct or indirect relationship with a bank or other financial institution. For example, some services require that the sending party either has an existing bank account with the institution transferring the funds, while others require the sending party to present a credit card or other bank card with cash advance capabilities. This may simply not be an option for some users, such as migrant or seasonal workers who want to send money back to family at a distant location, including a foreign country, but do not have bank accounts or credit cards due to their itinerant nature or lack of credit history. Moreover, conventional money wiring services typically require that both the sending and receiving party have access to money wiring facilities such as a bank teller or a Western Union location, and that such locations be open at the time of day at which the Sender wishes to send and the Recipient seeks to retrieve the funds.

Accordingly, there is a need for a system and method for transferring value that allows a Sender and receiver to transfer money without a preexisting relationship with a financial institution such as a bank or other credit card issuer. There is also a need for such a system and method to be implemented using existing financial or electronic banking networks and without the need for extensive new infrastructure at either the sending or receiving location.

SUMMARY OF THE INVENTION

The present invention provides a system and method for automated value transfer. Embodiments of the invention may be used for transferring money between a Sender and Recipient without requiring either party to have access to a bank account, credit card, or other preexisting relationship with a financial institution. The present invention can be implemented using existing financial networks such as retail point-of-sale locations, automated teller machines (ATMs), and other cash dispensing units.

In an embodiment of the present invention, a Sender at a first location purchases a card, referred to sometimes in this specification as a "PIN Card," at a point of sale, such as a retail location or a bank teller. Upon purchase of a PIN Card, a string or Transfer PIN associated with the PIN Card is activated in an authorization system, with the string or Transfer PIN also associated with a value corresponding to the purchase amount of the PIN Card (e.g., 3,000 Mexican pesos). The Sender contacts an intended Recipient at a remote location and discloses the string or Transfer PIN to that intended Recipient. In embodiments, the Recipient needs only this string or Transfer PIN and a card, sometimes referred to in this specification as a "Cash Card," to receive the money transfer at a participating remote location. Also, in embodiments, almost any Cash Card can be used with any valid Transfer PIN to receive value transfers. To receive the value associated with the PIN Card, the Recipient inserts or swipes the Cash Card at a participating dispensing unit such as an ATM, which reads and routes appropriate transaction information to an authorization system. The Recipient then enters the string or Transfer PIN, which the authorization system identifies as being a valid entry that is associated with the value amount associated with the PIN Card. The authorization system then authorizes the dispensing unit to dispense that value amount.

In another aspect of an embodiment of the present invention, the Recipient uses a PIN Card or Cash Card to receive money in accordance with promotions or sweepstakes. For example, a particular string or PIN may be publicly advertised as part of a promotion or sweepstakes. PIN Card and Cash Card holders may insert or swipe their cards at appropriate units such as ATMs, thereby providing, in such embodiments, information enabling an authorization system to identify a particular card and, for example, its owner. Once the card holder enters the publicly advertised string or PIN, which identifies the particular promotion or sweepstakes being run, the authorization system uses predetermined criteria such as a historical usage pattern of the PIN Card or Cash Card, whether the card is being used for the first time, or a random or unpredictable event, to determine whether to authorize the dispensing unit to dispense a predetermined amount of funds.

In accordance with the present invention, a method is provided for obtaining a cash withdrawal from a dispensing unit comprising: enabling the dispensing unit, in response to a first numeric string, to receive a second numeric string associated with a predetermined cash amount, where the first numeric string is associated with a disbursement account available to a plurality of unrelated users; entering the second numeric string into the dispensing unit; and obtaining the predetermined cash amount from the dispensing unit, which may comprise an ATM or a point-of-sale terminal at a retail location. In embodiments, the first numeric string is not associated with a distinct user account such as an individual bank account. The first numeric string may be stored on a magnetic stripe on a card that is input to the dispensing unit. In an embodiment, the second numeric string is randomly generated and essentially unique. The second numeric string may also be essentially independent of the first numeric string, and is not necessarily associated with the card or the first numeric string prior to the step of entering the second numeric string into the dispensing unit. The second numeric string may further comprise a plurality of subset strings which are separately input into the dispensing unit.

In accordance with another aspect of the present invention, a method is provided for obtaining a cash withdrawal from a dispensing unit, comprising: enabling the dispensing unit, in response to a first numeric string, to receive a second numeric string associated with a predetermined cash amount, where the first numeric string is associated with a disbursement account available to a plurality of unrelated users; entering the second numeric string into the dispensing unit; and obtaining a portion of the predetermined cash amount from the dispensing unit, wherein the portion of the predetermined amount is selected by a user of the dispensing unit.

According to still another aspect of the present invention, a method is provided for authorizing cash withdrawals from a dispensing unit, comprising: enabling a dispensing unit, in response to an essentially unique first numeric string, to receive a second numeric string; receiving the second numeric string at the dispensing unit; and authorizing a cash withdrawal from the dispensing unit if the second numeric string matches an expected value and if the first numeric string meets predetermined criteria based either on a historical usage pattern associated with the first numeric string or on promotional rules. In this aspect of the present invention, the second numeric string is publicly advertised. The predetermined criteria may be based on a historical usage pattern associated with the first numeric string, including for example specified transactions, a predetermined number of cash withdrawals, or a predetermined number of cash withdrawals within a predetermined time period prior to the receiving step. The predetermined criteria may also be based on promotional rules, including a random or unpredictable activation event or an intentional activation event associated with the first numeric string. Such events may be independent of the historical usage pattern associated with the first numeric string.

In still another aspect of the present invention, a method is provided for transferring value, comprising: activating from a first location a representation of a predetermined value associated with an essentially unique identification string; receiving the essentially unique string at a second location comprising a cash dispensing unit; and authorizing a disbursement of a cash amount at the cash dispensing unit responsive to a numeric string and the essentially unique identification string. The cash amount dispensed may be the predetermined value, or it may be a portion of the predetermined value selected by a user of the cash dispensing unit. The essentially unique identification string may further comprise a plurality of subset strings which are separately entered, with a decline or termination message being generated if the complete essentially unique identification string has not been received. The first location may be a retail store at which a user remits a cash equivalent amount of the predetermined value, and the cash dispensing unit may for example be an ATM, a point-of-sale terminal at a retail location, or a person. The predetermined value may correspond to a predefined currency value of a multiple of whole currency units at a second location (for example, 1,000, 2,000, or 3,000 Mexican pesos). In accordance with this aspect of the present invention, the method for transferring value may further comprise the step of activating the cash dispensing unit in response to the insertion or presentation of a card that stores the numeric string.

According to another aspect of the present invention, a method for transferring value comprising receiving from a first location a signal to activate a representation of a predetermined value associated with an essentially unique identification string; receiving from a second location, comprising a cash dispensing unit, the essentially unique identification string, where the essentially unique identification string is routed from the second location to an authorization system in response to routing information input into the cash dispensing unit; and the authorization system authorizing, responsive to the essentially unique identification string, a disbursement from the cash dispensing unit of an amount of the predetermined value. In this aspect of the present invention, the authorization does not necessarily depend upon the routing information.

According to still another aspect of the present invention, a method is provided for activating an automated teller machine (ATM) comprising reading information stored on a card inserted into the ATM, where the information comprises a numeric string associated with a disbursement account and not associated with a distinct user account; and activating the ATM in response to the numeric string.

According to another aspect of the present invention, a system is provided for transferring value comprising: information received including an essentially unique string and an amount associated with the essentially unique string; a disbursement account available to a plurality of unrelated users; an authorization system for authorizing disbursements from the disbursement account; and a cash dispensing unit operable to receive the essentially unique string, transmit the essentially unique string to the authorization system, and dispense the amount in response to an authorization of disbursement from the disbursement account.

In another aspect of the present invention, a card is provided for transferring value, comprising: a first storage medium comprising a magnetic stripe, where the first storage medium stores information identifying the card; a second storage medium that stores a string associated with a transferred value; and a calling code printed on the card for communicating the string to a remote user; where responsive to the input of the string, a cash dispensing unit dispenses a cash equivalent of the transferred value to the remote user. The second storage medium may be in human readable form, and may also store a second string generated by a number generator and associated with the calling code. The card may alternatively comprise a third storage medium that stores a second string associated with the calling code. The second storage medium or the third storage medium may comprise a scratch-off film for hiding the information stored on them. In accordance with this aspect of the present invention, the transferred value may be a predetermined foreign currency value in a multiple of whole currency units.

According to still another aspect of the present invention, a card is provided for activating a cash dispensing unit, the card comprising: a storage medium, where the storage medium stores information comprising a numeric string associated with a disbursement account accessible by a plurality of unrelated users; and wherein upon insertion of the card into a cash dispensing unit, the numeric string serves to validate the card to conduct a transaction with the disbursement account.

According to another aspect of the present invention, a card is provided for activating a cash dispensing unit, comprising: a storage medium that stores information comprising a numeric string associated with a disbursement account accessible by a plurality of unrelated users, and where, in response to inserting the card into a cash dispensing unit and entering an essentially unique string into the cash dispensing unit, the cash dispensing unit dispenses a predetermined amount of cash associated with the essentially unique string.

Additional features and advantages of the present invention are set forth in part in the description that follows, and in part are apparent from the description, or may be learned by practice of the invention. The embodiments and features of the invention may also be realized and attained by means of the instrumentalities and combinations particularly set out in the appended claims.

BRIEF DESCRIPTION OF THE FIGURES

The accompanying drawings, which are incorporated in and constitute part of the specification, illustrate embodiments of the invention, and together with the description, serve to explain the operation of the invention.

DETAILED DESCRIPTION

With reference to the figures, a detailed discussion of the preferred embodiments of the present invention is presented. However, the figures and examples below are not meant to limit the scope of the present invention or its equivalents or any embodiments that would be apparent to one of ordinary skill in the art in light of this specification.

Figure 1:
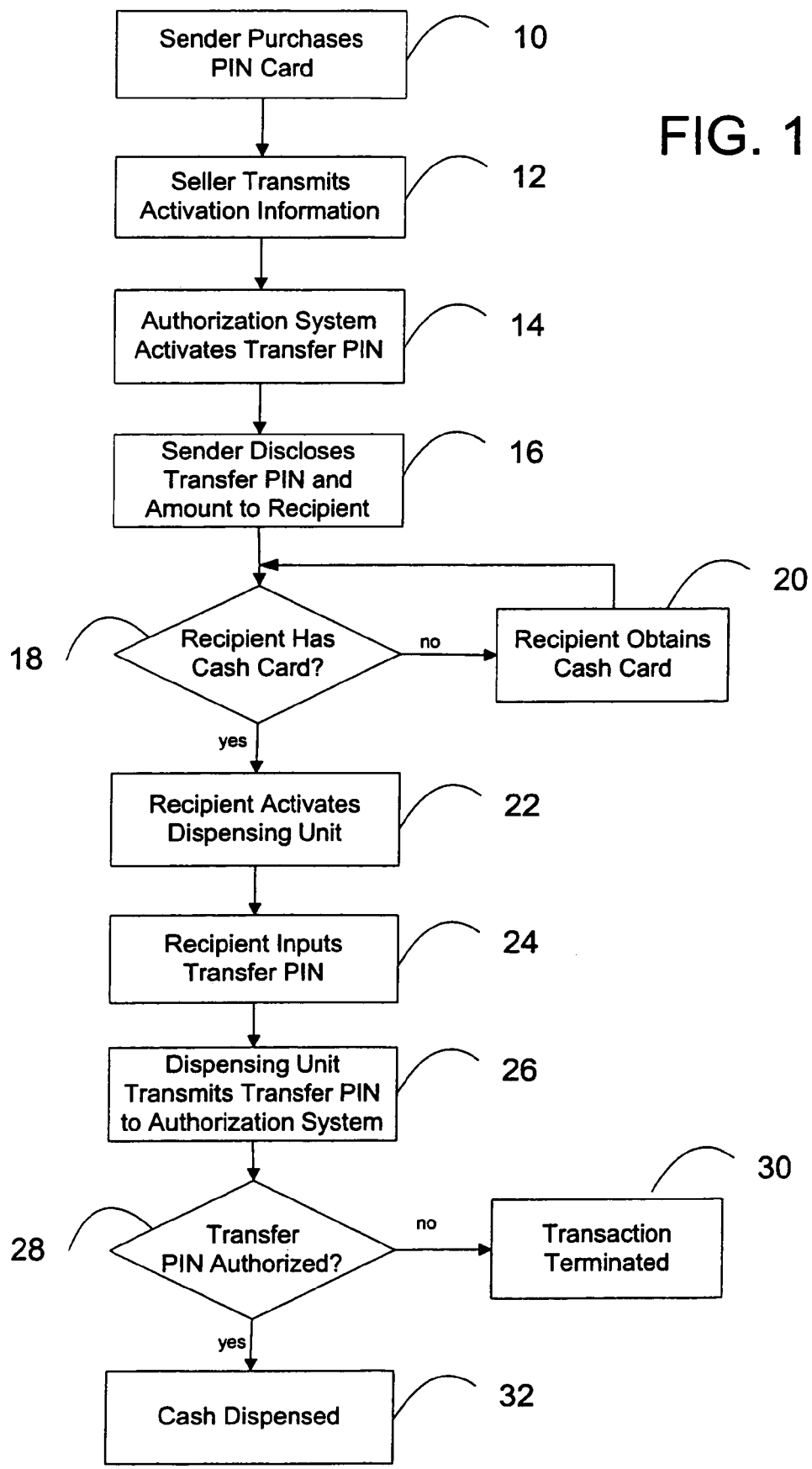
FIG. 1 is a flowchart depicting a summary of the steps of an embodiment of the present invention.

FIG. 1 depicts a summary of the steps of an embodiment of the present invention. In step 10 of FIG. 1, a Sender purchases a PIN Card. As described in more detail below, this purchase can occur at any number or type of retail or other installations. In this example, before the Seller transfers the PIN Card to the Sender, in step 12 the Seller transmits activation information to an authorization system (not depicted in FIG. 1), using information and techniques described in more detail in this specification. In response to valid information from the Seller, the authorization system in step 14 activates the Transfer PIN, and associates it with a value corresponding to the purchase amount of the PIN Card. For example, if the Sender in the United States wants to transfer 3,000 Mexican Pesos to a friend in Mexico, the purchase price of the PIN Card could be the U.S. equivalent of 3,000 Pesos, plus a Seller's fee or commission, plus a fee or commission to the authorization system. Once the Transfer PIN is activated, in this example it is associated in the authorization system with the value of 3,000 Mexican Pesos.

Continuing further with the example depicted in FIG. 1, the Sender in step 16 discloses the Transfer PIN and the amount of value associated with the Transfer PIN to the intended Recipient. This can be done, for example, by telephone or by other means that the Sender and intended Recipient choose. In the embodiment depicted in FIG. 1, the Recipient needs a Cash Card in order to retrieve the funds to be transferred from the Sender. Accordingly, in step 18 it is determined whether the intended Recipient has a Cash Card. If not, then in step 20 the intended Recipient obtains a Cash Card, as explained below in this specification. Once the intended Recipient obtains a Cash Card, the process depicted in FIG. 1 continues to step 22, in which the intended Recipient uses the Cash Card to activate a participating dispensing unit. In embodiments of the present invention, the dispensing unit can be an ATM machine, and it can be activated so that it is ready to receive information by inserting or swiping the Cash Card using devices known to those of skill in the art for transferring information on cards to ATM or similar machines. Once the dispensing unit is activated, the intended Recipient in step 24 then enters the Transfer PIN disclosed by the Sender into the dispensing unit, for example using a keypad in response to appropriate prompts. After the Transfer PIN is input, the dispensing unit in step 26 transmits it to the authorization system. In decision step 28, the authorization system determines whether the Transfer PIN is authorized. As explained in more detail below, this authorization can use any number of techniques designed to strike an appropriate balance between security of the system with the convenience of the users.

In the embodiment depicted in FIG. 1, if the Transfer PIN is not authorized, then in step 30 the dispensing unit is notified to terminate the transaction without dispensing any funds. On the other hand, if the Transfer PIN is authorized, then in step 32 the dispensing unit is signaled to dispense an amount of funds equal to the value associated with the Transfer PIN when the PIN Card was purchased. In the example described above, this amount would be 3,000 Mexican Pesos.

Figure 2:
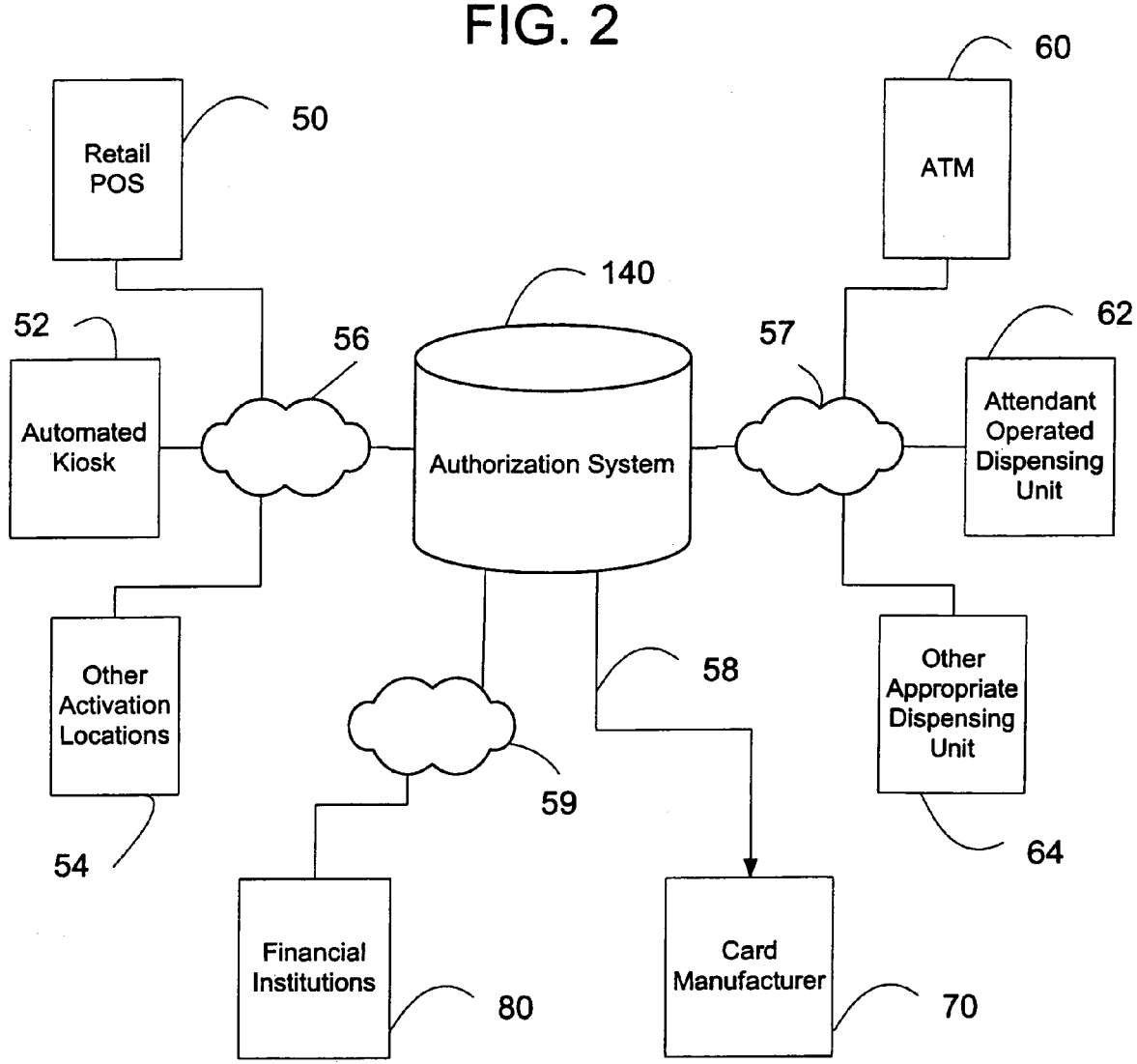
FIG. 2 depicts an authorization system in accordance with an embodiment of the present invention.

FIG. 2 provides an overview of the authorization system 140 in accordance with an embodiment of the present invention. In an embodiment, the authorization system 140 comprises a computer with appropriate communications, security, and information processing software, as well as databases and appropriate storage media as is appropriate for the specific implementation of the present invention. Although authorization system 140 is depicted in FIG. 2 as a single box, it should be understood that authorization system 140 may comprise a plurality of computing devices operating in conjunction and in cooperation with each other to provide the desired computing and data storage capabilities in accordance with a specific implementation of the present invention. Moreover, authorization system 140 may comprise computing and data storage devices distributed in multiple locations and networked by appropriate communications infrastructure to provide the desired computing and data storage capabilities in accordance with a particular implementation of the present invention.

In the embodiment depicted in FIG. 2, authorization system 140 receives information from, among other sources: Sender locations comprising retail points-of-sale 50, automated kiosks 52, or other PIN Card activation locations 54 via a communications network 56; Recipient locations comprising ATMs 60, attendant-operated dispensing units 62, or other appropriate dispensing units 64 via a communications network 57; financial institutions 80 via a communications network 59; and PIN Card and Cash Card manufacturer(s) 70 via an information transfer means 58 such as a CD or other electronic file. Information received from the Sender location includes, for example, the PIN Card Number and the amount of value being transferred, which are sent to the authorization system 140 when a PIN Card is activated, as explained above with respect to step 12 in FIG. 1 and as explained below in conjunction with FIG. 8. Information received from the Recipient location includes a first string, for example a Cash Card Number, and a second string, for example a Transfer PIN or other string used in conjunction with a sweepstakes or promotion. In embodiments of the present invention, such information is sent to authorization system 140 when a Recipient uses a Cash Card as explained above with respect to steps 22, 24, and 26 in FIG. 1 and as explained below with respect to FIG. 9 and FIG. 11. In embodiments, authorization system 140 receives information from the PIN Card and Cash Card manufacturer(s), including for example PIN Card Numbers, Transfer PINs, Calling Codes, Cash Card Numbers, and identification information from the PIN Card and Cash Card holders. This process is described below with respect to FIG. 5, FIG. 6, and FIG. 7. Depending on the embodiment, authorization system 140 may also communicate with one or more financial institutions 80, for example to debit or credit a corporate disbursement account, for example when funds are to be dispensed or when a PIN Card is purchased.

Figure 9:
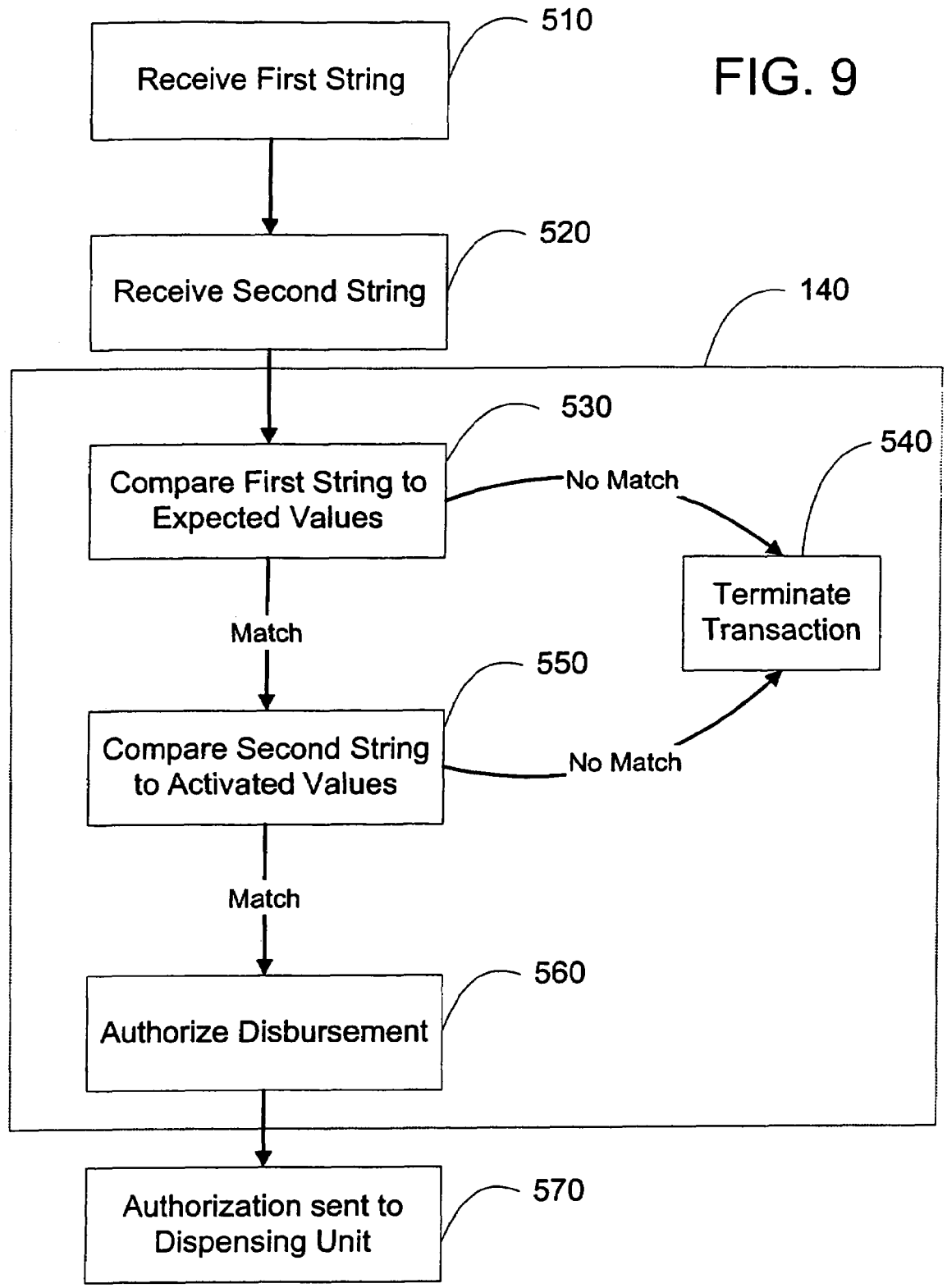
FIG. 9 depicts a process for dispensing funds at a dispensing unit in connection with a funds transfer in accordance with the present invention.
Figure 11:
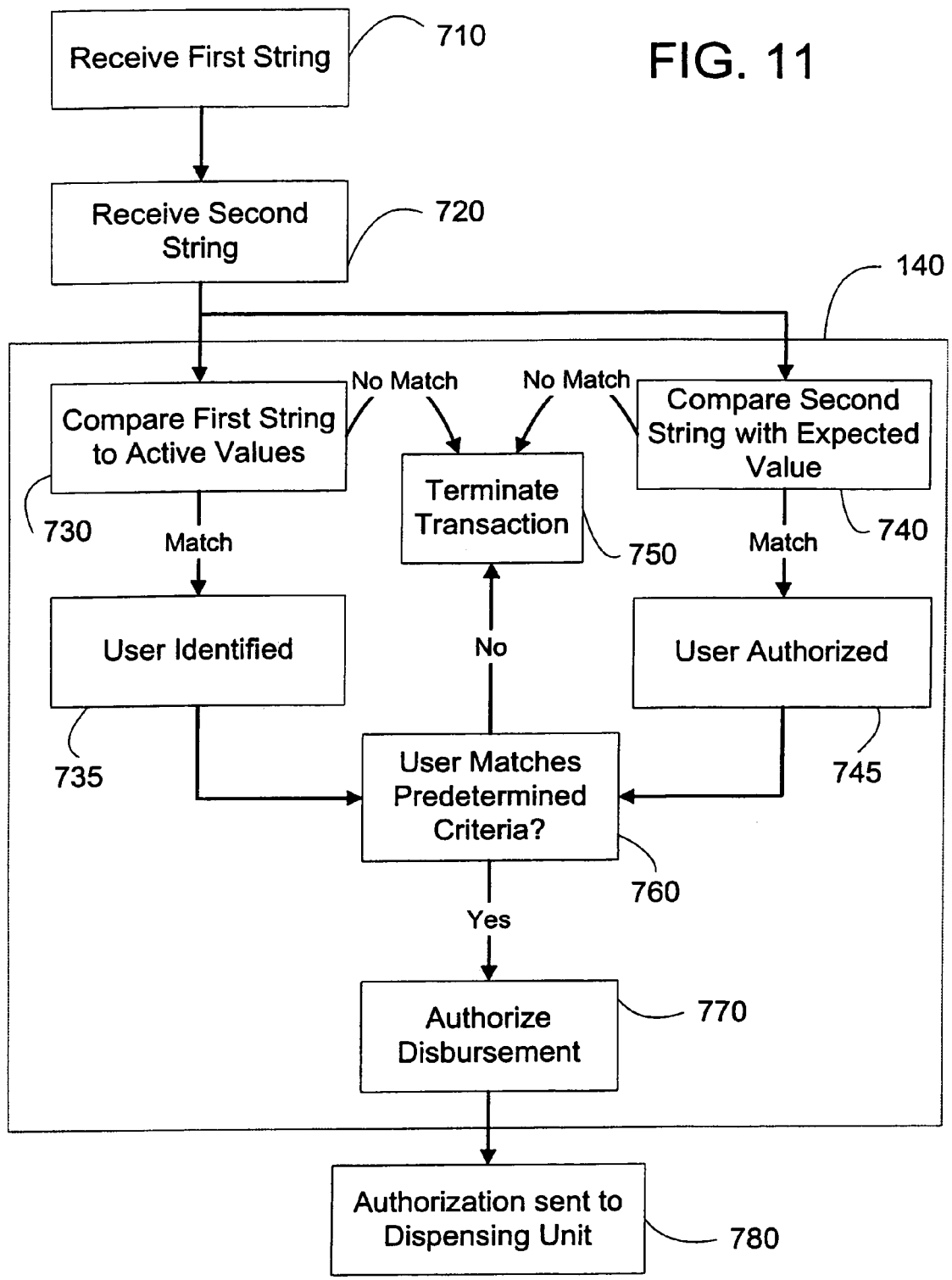
FIG. 11 depicts a process for dispensing money in accordance with an aspect of the present invention relating to a sweepstakes.

As explained in greater detail elsewhere in this specification, including for example with respect to FIG. 9 and FIG. 11, authorization system 140 receives information from these various sources and processes the received information in order, for example, to perform security and verification checks, compare received and stored data, make appropriate record keeping entries, and authorize disbursements to money transfer Recipients in accordance with the present invention.

Figure 3A:
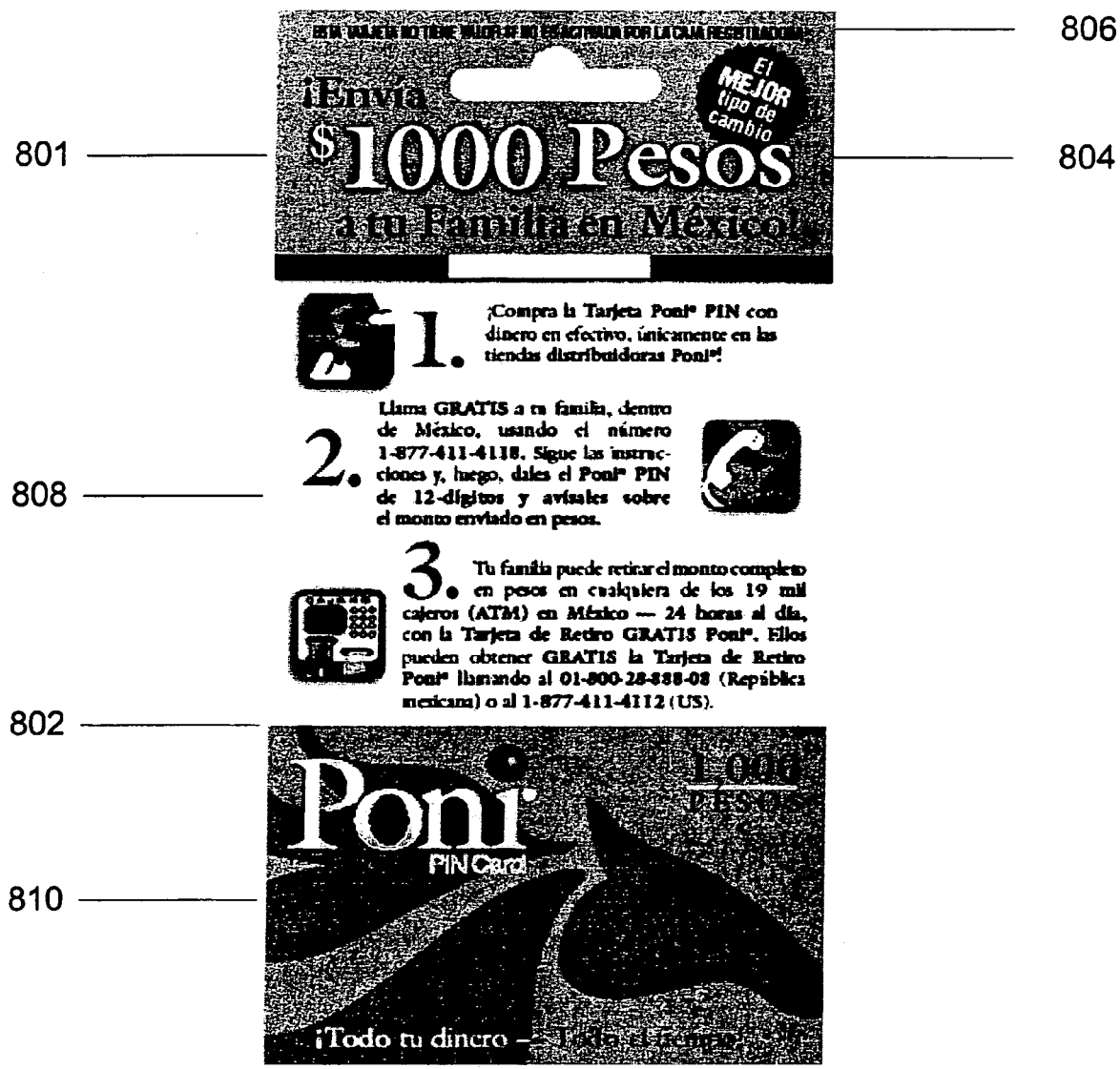
FIG. 3A depicts the front side of an exemplary PIN Card as sold for use in embodiments of the present invention.

FIG. 3A provides a depiction of the front side of an example of a PIN Card as might be purchased by a Sender in step 10 of FIG. 1. As depicted in FIG. 3A, PIN Card 160 is constructed of plastic or other suitable material such as conventionally used for credit cards, debit cards or gift cards. PIN Card 160 as depicted in FIG. 3A is a single piece, approximately the dimensions of three standard credit cards, and with scoring 802 to permit easy detachment of the bottom third as a separate card. As shown in FIG. 3A, the top third 801 of the PIN Card 160 includes an advertising message 804 that includes the amount of cash that may be transferred using the particular card, and a legend 806 (in Spanish in FIG. 3A) that the card has no value until it is activated. The middle third 808 of the PIN Card includes basic instructions (again in Spanish), on how to use the card. In the example depicted in FIG. 3A, the bottom third 810, which may be detached, includes a logo and design.

Figure 3B:
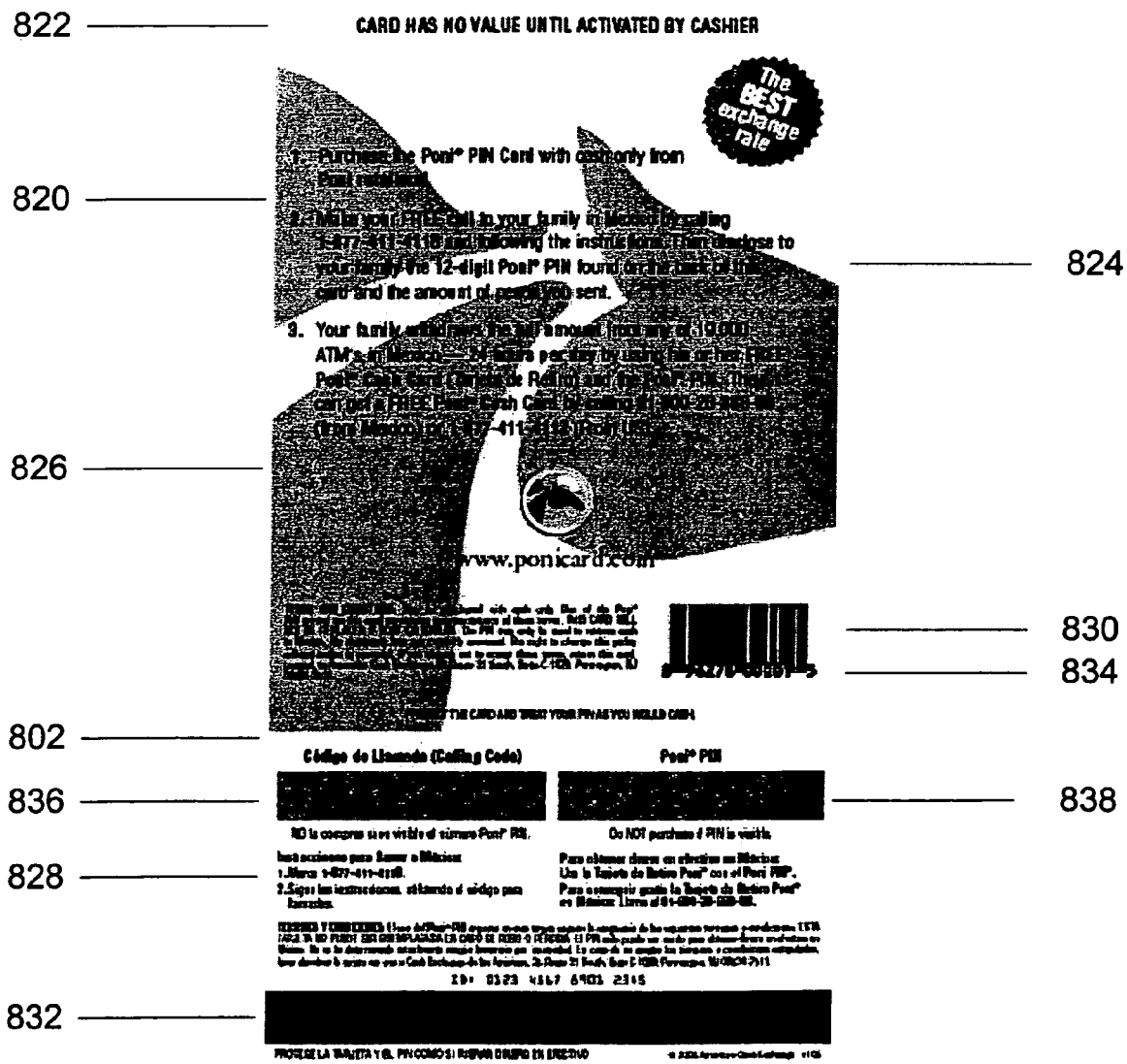
FIG. 3B depicts the back side of the exemplary PIN Card depicted in FIG. 3A.

FIG. 3B provides a depiction of the back of the PIN Card 160 depicted in FIG. 3A. As depicted in FIG. 3B, the top third 820 of the back of the PIN Card 160 includes the legend 822 (in English) from the top third of the front of the PIN Card 160, along with instructions 824 in English on how to use the card, corresponding to the Spanish instructions on the middle third of the front of the card, as depicted in FIG. 3A. As also depicted in FIG. 3B, the top third 820 and the middle third 826 of the back of the PIN Card 160 include instructions in English, on how to get a Cash Card and on how to use a designated international telecommunications carrier to call the intended Recipient to inform him or her of the Transfer PIN 130 and the value represented by the card (1,000 Pesos in this example) once authorized. In the example depicted in FIG. 3B, the middle third 826 of the back of the PIN Card 160 includes terms and conditions on the use of the card. The middle third 826 of the back of the PIN Card 160 also includes a number 834 and its corresponding UPC bar code 830 that identifies the particular PIN Card product.

In the embodiment depicted in FIG. 3B, the bottom third 828 of the back of the PIN Card 160 includes Spanish-language instructions and terms and conditions corresponding to the English-language instructions and terms and conditions on the middle third 826 of the back of the PIN Card 160, as well as Spanish-language instructions on how to get a Cash Card and on how to use a designated international telecommunications carrier to call the intended Recipient to inform him or her of the Transfer PIN 130 and the value represented by the card once authorized. The bottom third 828 of the back of the exemplary PIN Card 160 depicted in FIG. 3B also includes a magnetic stripe 832 for recording and reading electronically encoded information, using techniques for recording and reading magnetic stripe information known to those in the art. In an embodiment of the present invention, the magnetic stripe 832 encodes a 16 digit Card Number that identifies a particular PIN Card 160, with the first six digits being the Issuer Identification Number (IIN), the next nine digits being the internal unique card number, and the final digit being the check digit that is calculated from the preceding 15 digits using an algorithm known to those in the art and that helps to assure accurate electronic transmission.

In the embodiment depicted in FIG. 3B, the bottom third 828 of the back of the PIN Card 160 also includes scratch-off areas 836 and 838, which are coated with a film or other material suitable for hiding information under it, while permitting the hidden information to be revealed when the film or other material is scratched or rubbed with a coin or other relatively rigid object. In this example, scratch-off area 836 hides a 12-digit Calling Code that enables a caller to make a toll-free call to an intended Recipient of the value represented by the PIN Card, and scratch-off area 838 hides a 12-digit Transfer PIN. However, in other embodiments not shown, the 12-digit Calling Code and the 12-digit Transfer PIN may be hidden by a single scratch-off area. As instructed on the back of the PIN Card 160, a Sender would call the designated international telecommunications carrier using the listed number, then enter the 12-digit Calling Code, and then enter an appropriate country code, and then enter the telephone number of the intended Recipient. Further to this example, upon reaching the intended Recipient, the Sender would then disclose the 12-digit Transfer PIN and the amount of value associated with the PIN Card and, if necessary, the instructions on how to obtain a Cash Card. The intended Recipient would then obtain funds according to the present invention, including for example the steps summarized in FIG. 1 or otherwise described in this specification.

Figure 4A:
FIG. 4A depicts the front side of an exemplary Cash Card for use in embodiments of the present invention.

FIG. 4A provides a depiction of the front of an embodiment of a Cash Card for use in the present invention. In this embodiment, the front 850 of Cash Card 310 includes a logo and design, as well as a legend 852 (in Spanish in FIG. 4A) identifying the year of activation of the Cash Card.

Figure 4B:
FIG. 4B depicts the back side of the exemplary Cash Card depicted in FIG. 4A.

FIG. 4B provides a depiction of the back of the embodiment of a Cash Card depicted in FIG. 4A. In this embodiment, the back 860 of the Cash Card 310 includes a magnetic stripe 862 for recording and reading electronically encoded information, using techniques for recording and reading magnetic stripe information known to those in the art. In an embodiment of the present invention, the magnetic stripe 862 encodes a 16 digit Card Number that identifies a particular Cash Card 310, with the first six digits being a Bank Identification Number (BIN) which serves to route Cash Card transaction information from the dispensing unit to the authorization system 140, the next nine digits comprise a unique Card Number associated with the Cash Card 310, and the final digit is a check digit that is calculated from the preceding 15 digits using an algorithm known to those in the art and that helps to assure accurate electronic transmission. In the example shown in FIG. 4B, the 16-digit Cash Card Number 350 is also displayed in human readable form. The back 860 of the Cash Card 310 also includes language 864 identifying the Cash Card 310 as property of the issuer of the card, as well as telephone numbers 866 that can be called for information or customer assistance.

Figure 5:
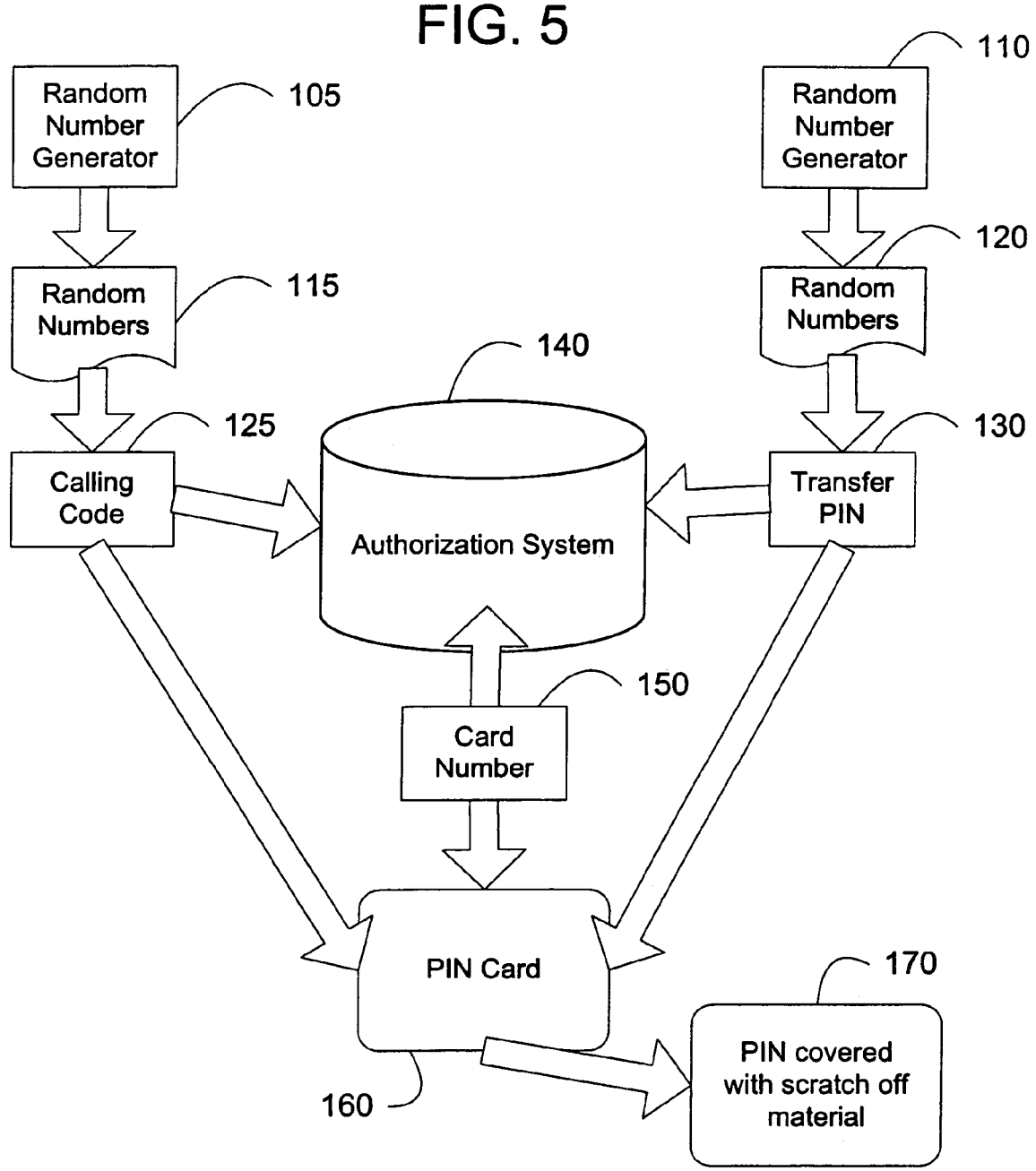
FIG. 5 is a flowchart representing a process for creating a PIN Card in accordance with the present invention.

FIG. 5 illustrates a process used to associate information with PIN Cards 160 in accordance with an embodiment of the present invention. Random number generators 105 and 110 are used to generate two sets of random numbers 115 and 120, respectively. In embodiments, random numbers 115 are twelve digits long and are used to generate a Calling Code 125, which is printed on PIN Card 160. At the same time, Calling Code 125 is stored in an authorization system 140, which comprises a database and other associated software and hardware for manipulating the data stored in the database, as described with reference to FIG. 2. As described with reference to FIG. 3B, the Calling Code 125 may be used by the Sender, in conjunction with a designated international telecommunications carrier using the toll-free number printed on the PIN Card, to call the intended Recipient to pass along the Transfer PIN 130.

In embodiments, random numbers 120 are preferably 12 digits long and each is used as a separate Transfer PIN 130, which is printed on PIN Card 160. At the same time, In embodiments, transfer PIN 130 is stored in authorization system 140. In embodiments, Transfer PINs 130 are essentially unique, in that they are 12-digit strings generated by a random-number generator 110 and are checked against previously generated Transfer PINs 130 to ensure that there is no duplication within a specified time period, in order to provide a very high degree of confidence that two or more identical Transfer PINs 130 are not active simultaneously. For example, in an embodiment, more than a predetermined number of months, such as twelve, would be required to elapse after a specific 12-digit Transfer PIN had been used for a funds transfer before it could be activated again for use with the same authorization system 140.

In embodiments, the PIN Card 160, in addition to having the Calling Code 125 and Transfer PIN 130 printed on it, is also assigned a Card Number 150, which is stored in authorization system 140. In embodiments, the Card Number 150 is 16 digits, where the first 6 digits comprise an Issuer Identification Number (IIN) which serves to route transactions from a point-of-sale terminal at a retail location to authorization system 140, the next nine digits comprise a unique card number associated with the specific PIN Card 160, and the final digit is a check digit to assure accurate electronic transmission. Card Number 150 may also be stored on PIN Card 160, for example in a storage medium such as a magnetic stripe or printed on the card in a human readable format. In embodiments, the Card Number 150 is not directly associated with a particular money transfer transaction but instead may be used to keep track of the use and purchase of PIN Cards and Transfer PINs, and for market research, promotions and sweepstakes, and other business reasons. In embodiments, the Calling Code 125 and Transfer PIN 130 are both associated with the Card Number 150 in a database in authorization system 140.

In the embodiment depicted in FIG. 5, the next step 170 in the PIN Card creation process is the covering of the Calling Code 125 and Transfer PIN 130 with opaque material to keep them from being known prior to purchase of the PIN Card 160. Calling Code 125 and Transfer PIN 130 may be covered by a single scratch-off surface or by separate scratch-off surfaces. Other suitable means for hiding Calling Code 125 and Transfer PIN 130, such as peel off tape, microencapsulation of ink patterns, radio or electronic readers, and the like, are apparent to those of skill in the art in light of this specification.

It should be understood that, for Calling Code 125, Transfer PIN 130 and Card Number 150, other shorter or longer strings may be used for greater or lesser security, balanced against ease and convenience of use. Similarly, Calling Code 125, Transfer PIN 130 or Card Number 150 may comprise alphanumeric or other strings consistent with various types of strings that are capable of being read by or input into dispensing units and financial and other electronic networks at various locations used in conjunction with the present invention. In embodiments of the present invention, the Calling Code 125 and Transfer PIN 130 could be the same, i.e., the Transfer PIN could function as the Calling Code.

Figure 6:
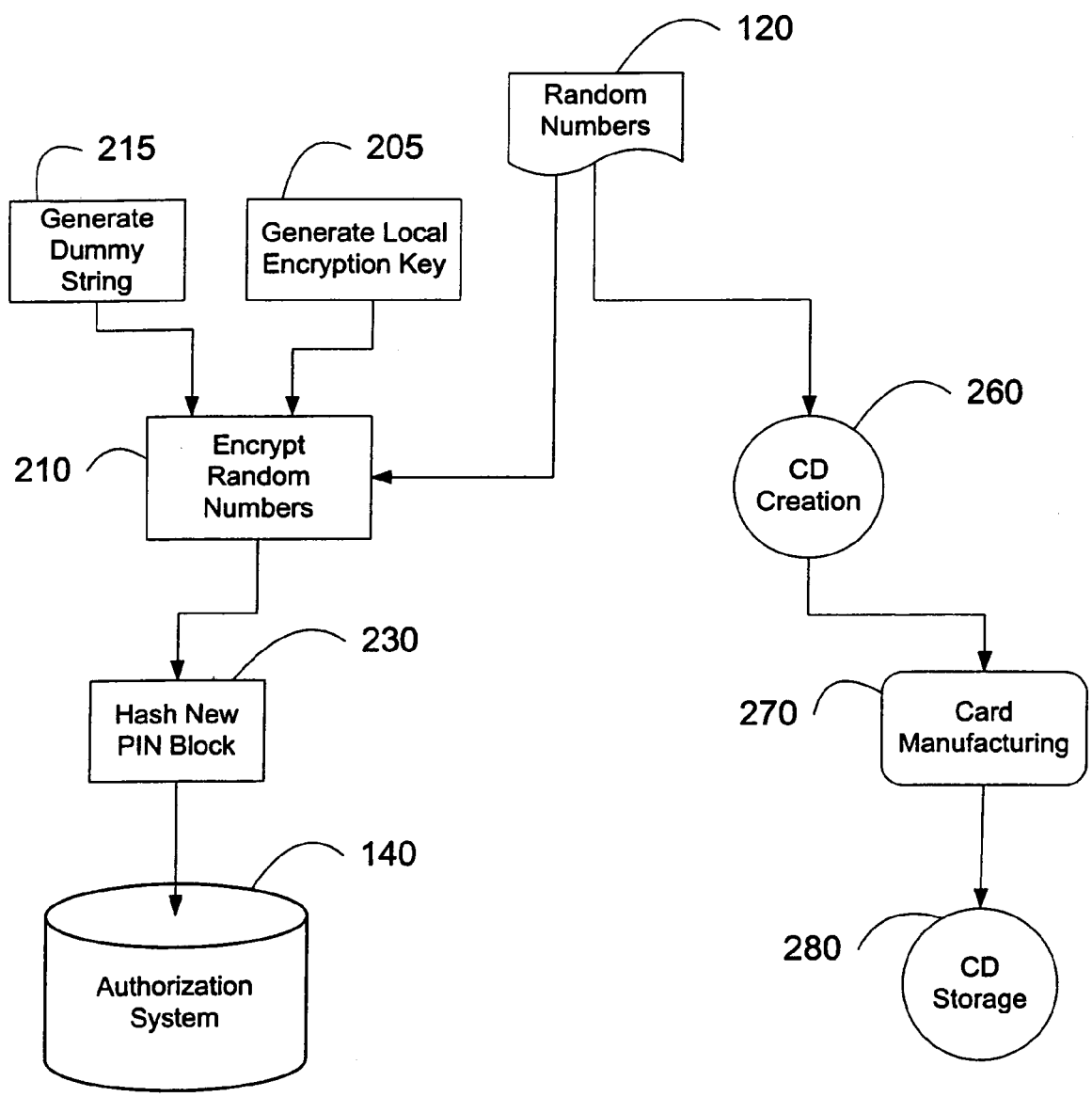
FIG. 6 is a flowchart depicting a process for inserting a Transfer PIN into a database of an authorization system according to the present invention.

FIG. 6 illustrates an embodiment of the process used to insert Transfer PINs 130 for storage in a database in the authorization system 140, for later comparison in accordance with, for example, step 550 of FIG. 9. Random numbers 120, which in an embodiment are 12-digit strings such as Transfer PINs 130, are encrypted in step 210 using a local encryption key generated in step 205 and a dummy string generated in step 215. In embodiments, the dummy string is a constant but relatively random number that is used in encryption of the Transfer PINs 130. In step 230, the encrypted PIN Block is hashed and put into data storage in the authorization system 140. In embodiments, the encryption step 210 and hashing step 230 are performed by computing devices in authorization system 140. In the embodiment depicted in FIG. 6, the 12-digit strings such as the Transfer PINs 130 are not stored in a "clear," non-encrypted form, thereby enhancing the security of the Transfer PINs.

In the embodiment depicted in FIG. 6, random numbers 120, in this embodiment 12-digit strings such as Transfer PINs 130, are also stored in a non-encrypted form. This is done to keep a record of the actual generated Transfer PINs in the event that the encrypted PINs are lost or the data is corrupted. The random numbers 120 are stored on a CD in step 260, and are used as Transfer PINs 130 in the PIN Card 160 manufacturing process 270 depicted generally in FIG. 5. In step 280 of FIG. 6, the CD created in step 260, which stores the generated Transfer PINs 130, is kept in a secure location, such as a safe, and is accessed if needed (for example, if the encrypted PINs are lost).

Figure 7:
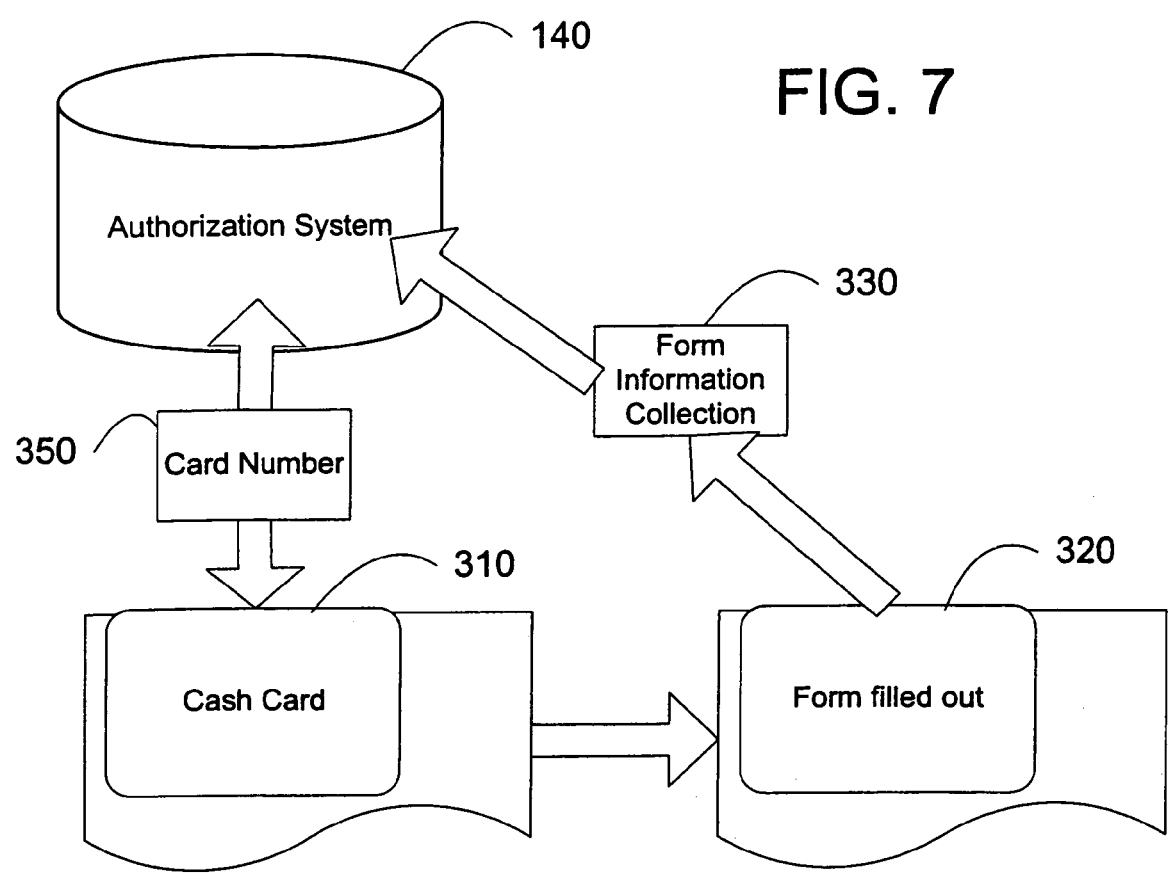
FIG. 7 depicts a process for creating a Cash Card in accordance with the present invention.

FIG. 7 illustrates an embodiment of the process used to create Cash Cards 310 in accordance with the present invention. In embodiments, Cash Cards 310 are distributed free of charge to Recipients by various methods. For example, in an implementation of the present invention designed to facilitate money transfers between migrant or seasonal workers in the United States and their families in Mexico, Cash Cards 310 could be made available free of charge at local banks and businesses or fairs or other events or gatherings in Mexico, or could be requested by mail or other suitable means, such as by e-mail or by calling a toll-free number. In an embodiment, the Recipient fills out a form 320 prior to receiving the Cash Card 310. Depending upon the scope of services to be offered in conjunction with the funds transfers of the present invention, the form 320 may request a variety of types of information, such as detailed information to identify the user of each Cash Card 310, or general information to be collected for marketing reasons. In embodiments of the present invention, the completed form 320 is collected 330, and the form information is stored in authorization system 140. In embodiments, the Cash Cards 310 are assigned Card Numbers 350, which are stored in the authorization system 140. The Card Number 350 is also stored on the Cash Card 310, for example on a storage medium such as a magnetic stripe or printed on the card in a human readable format. In embodiments, the Card Number 350 is 16 digits, with the first six digits comprising a Bank Identification Number (BIN) which serves to route Cash Card transaction information from the dispensing unit to the authorization system 140, the next nine digits comprise a unique Card Number associated with the Cash Card 310, and the final digit is a check digit. In embodiments, the Card Number 350 may be used to keep track of the use of the card and for market research, promotions and sweepstakes, and other business reasons.

Figure 8:
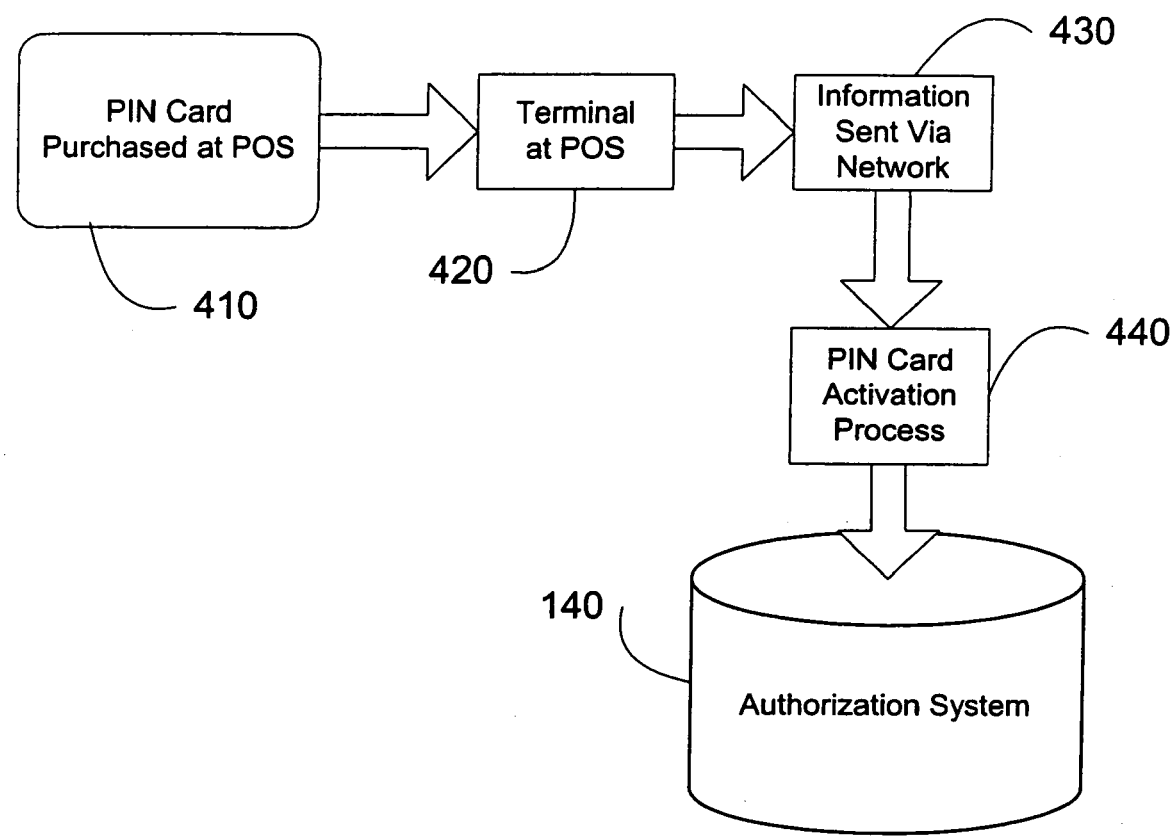
FIG. 8 depicts a process for activating PIN Cards in accordance with the present invention.

FIG. 8 provides a flowchart depicting an embodiment of the activation process for PIN Cards, which is a step in a money transfer transaction in accordance with the present invention. A user, sometimes designated a Sender, initiates a money transfer transaction in step 410 by purchasing and activating a PIN Card at a point-of-sale (POS) location using a POS terminal 420. In embodiments such points-of-sale terminals will be placed at retail locations such as convenience stores or gas stations, but they may be at any suitable location to reach the desired customers depending upon the implementation of the present invention. In embodiments, PIN Cards 160 are associated with predetermined values, in the denomination of the intended Recipient's community. For example, for Mexican migrant workers in the United States, the PIN Cards 160 could be sold for dollars in multiples of whole currency units of Mexican pesos (e.g., 1,000 pesos, 2,000 pesos, etc.). The cost to the Sender could for example be the value of the card converted to the local currency (e.g., U.S. dollars) using an applicable exchange rate at the time of the transaction, plus a transaction fee or commission to the operator of the system as well as to the Seller. Other values of PIN Cards 160 could be used as well, including, for example, multiples of whole number amounts of the local currency at the Sender's location, or other amounts selected by the Sender or the Seller of the PIN Cards 160. Similarly, PIN Cards 160 could be sold in and for various and differing currency units. As an example, a foreign exchange kiosk at an international airport might, for appropriate fees, accept a wide range of foreign currencies to purchase PIN Cards 160 associated with values in an equally wide range of foreign currency units.

In the embodiment depicted in FIG. 8, at step 420 PIN Card 160 is swiped at a point-of-sale terminal, resulting in the transmission, in step 430, of information associated with the PIN Card through a communications network 56 (depicted in FIG. 2) to an authorization system 140 for the PIN Card activation process at step 440. As apparent to one of skill in the art in light of this specification, information associated with the PIN Card 160 can be obtained and transmitted in a variety of suitable ways, including for example, reading the information from the PIN Card and signaling authorization system 140 through the use of a keypad, or reading the information to a telephone voice response unit or live operator, who then inputs the information into an authorization system 140. In embodiments, the information transmitted by the Seller includes the amount of value and the foreign currency units associated with the PIN Card 160. In other embodiments, the amount of value and foreign currency units associated with the PIN Card 160 have themselves been previously associated with the PIN Card Number 150. In embodiments, the information transmitted to authorization system 140 also includes other information, such as information appropriate to verify the Seller, to track the Seller's sales of PIN Cards, or to identify the Sender purchasing the PIN Card.

In the embodiment depicted in FIG. 8, at step 440 the PIN Card is activated by the authorization system 140. This activation step may include, for example, completing verification checks on any or all of the Seller, the Sender, and the PIN Card Number. Such verification checks may include a variety of heuristics designed to prevent crime or fraud, as apparent to those of ordinary skill in the art in light of this specification. The particular heuristics used may vary depending upon the specific practical implementation of the present invention, and may depend upon the level of security and crime prevention desired, any applicable regulatory requirements, and other relevant factors. In embodiments, the authorization system 140 identifies the PIN Card Number 150 and associates it with a specific Transfer PIN 130. After verification and authorization procedures have been successfully completed, PIN Card 160 is considered activated, and the Transfer PIN 130 and the Calling Code 125 are considered activated. In embodiments, in authorization system 140, an activated PIN Card is reflected in a record flagged as active that associates a specific Transfer PIN 130 with a Card Number 150 and a Calling Code 125, as well as an amount of value in a particular currency unit (e.g., 3,000 Mexican Pesos). After the PIN Card is activated, the Seller is signaled, through a telecommunications network or other suitable means, that the PIN Card 160 is activated so that the Sender may be so informed. In embodiments, the Seller may itself be an interactive electronic device, such as an ATM, that accepts cash or debit or credit cards, for example, permits the selection of currency units and amounts, automatically signals the authorization system 140 in response to Sender commands and inputs, and dispenses activated PIN Cards 160.

Once the PIN Card 160 is activated, the Sender is then able to use Calling Code 125 along with a designated international telecommunications carrier using the toll-free number displayed on the PIN Card 160 to call the intended Recipient, informing him or her that the funds transfer has been initiated and authorized, disclosing the Transfer PIN 130, and providing instructions, if necessary, on how to obtain a Cash Card. Of course, other methods my be used to relay this information, such as e-mail, telegrams, letters or pay telephone calls.

FIG. 9 provides a flowchart depicting the steps performed by an embodiment of a system of the present invention in authorizing a disbursement of funds from a dispensing unit. In an embodiment, the intended Recipient starts the process by inserting a Cash Card 310 into an ATM or other dispensing unit, thereby activating the unit to accept input from the intended Recipient. In other embodiments, other techniques and technologies, including bank tellers or attendant-operated or fully automated terminals could be used in connection with the disbursement of funds according to the present invention.

In the embodiment depicted in FIG. 9, in step 510 the ATM or other dispensing unit receives a first string of information. This string could be alphanumeric information, and in embodiments is a 16-digit number, with the first six digits comprising a BIN number to direct the dispensing unit on where and how to route information concerning the transaction, and with the next ten digits comprising a nine-digit unique Cash Card Number and a one-digit check digit, as described above with respect to the Card Number 350 described above. Many alternatives can be provided for performing the functions of step 510. These could include automated identification of the carrier of Cash Card 310, for example using biometrics information, ranging to no specific identification of the Cash Card carrier, with the intended Recipient simply pressing a button on a keypad to signal the dispensing device to activate and to route transaction information to the authorization system 140.

Continuing with the example of FIG. 9, in step 520 the dispensing unit receives a second string. In embodiments, this is the Transfer PIN 130 that was disclosed to the intended Recipient by the Sender. For example, in response to prompts from the dispensing unit, this second string can be input into the dispensing unit using a keypad, voice recognition unit or other appropriate techniques and technologies, as apparent to one of skill in the art in light of this specification. In embodiments, the dispensing unit encodes or encrypts the first string (e.g., the Cash Card Number 350) and the second string (e.g., the Transfer PIN 130) before transmitting them over a telecommunications network to the authorization system 140, and the authorization system 140 decodes or decrypts them before engaging in comparison and authorization steps 530, 550 and 560, depicted in FIG. 9. This process is discussed in greater detail below with respect to FIG. 10.

In the embodiment depicted in FIG. 9, the authorization system 140, in step 530, compares the first string, as received from the dispensing unit, to expected values of the first string. For example, the authorization system 140 may compare the nine-digit number received as the unique Cash Card Number with a list of authorized and active Cash Card Numbers 350 to confirm that the Cash Card 310 being used at the dispensing unit was properly issued, has not been reported lost, etc. If the first string fails to meet the comparison test of step 530, the authorization system terminates the transaction at step 540, and sends appropriate messages to the dispensing unit. These could include, for example, messages to the intended Recipient to reinitiate the process by re-inserting or re-swiping the Cash Card 310, or messages that the Cash Card 310 will not be accepted for a designated period of time or, depending on an analysis of the Cash Card Number 350 and other factors indicating fraud or abuse, that the Cash Card 310 is being retained by the dispensing unit.

If, on the other hand, the first string meets the comparison test of step 530, in an embodiment the authorization system 140 proceeds to step 550 to compare the second string to activated values of Transfer PINs 130. For example, the authorization system 140 may compare the Transfer PIN 130 received from the intended Recipient and transmitted by the dispensing unit to the authorization system 140 to confirm that the Transfer PIN 130 has been properly activated, for instance using the process depicted with reference to FIG. 8. Comparison step 550 may, in embodiments, include other considerations in addition to the receipt of an active and valid Transfer PIN 130. For example, the comparison test of step 550 may be met only if the Transfer PIN 130 is received from a particular geographic location, or within a specified time period during a day, or within a specified time after the Transfer PIN 130 has been activated. If the second string fails to meet the comparison tests of step 550, the authorization system 140 terminates the transaction at step 540, and sends appropriate messages to the dispensing unit, as described above.

An embodiment of the present invention, not depicted, involves repeated or "piecewise" entry of the Transfer PIN 130, for example. In order to assure additional security, comparison step 550 may not determine that the second string matches activated values until the second string has been entered a requisite number of times. Thus, in such an embodiment, the transaction would not be terminated before the Transfer PIN 130 had been entered the requisite number of times, but rather an appropriate message would be sent to the intended Recipient or dispensing unit to instruct the intended Recipient to enter the Transfer PIN 130 again.

In another embodiment (not depicted), the Transfer PIN 130 could be a string with a length exceeding the length of a typical Transfer PIN 130. For example, if a typical Transfer PIN 130 is a 12-digit string, a highly secure Transfer PIN 130 could be 36 or 60 or more digits. Rather than receiving the entire Transfer PIN 130, in such embodiments the authorization system 140 could receive the Transfer PIN 130 piecewise, for example in groups or subsets of 12-digit strings. In such embodiments, the comparison step 550 of FIG. 9 would be modified to include interactive receipt and comparison of portions of the Transfer PIN 130, with appropriate messages to continue entering further portions or that a portion has not successfully passed the appropriate comparison test. Once all portions have been entered, the authorization system 140 authorizes a cash disbursement if the concatenated entries correspond to an active Transfer PIN 130 value.

In still other embodiments (not depicted), a similar piecewise entry of a Transfer PIN 130 may involve successive entries of, for example, two six-digit strings to form a complete 12-digit Transfer PIN 130, or any other combination of shorter strings as appreciated by one of ordinary skill in the art.

If the second string passes the comparison test of step 550, then in the embodiment depicted in FIG. 9 the authorization system 140, in step 560, authorizes the disbursement and the appropriate record keeping entries. The authorization system may perform verification checks using the first and second strings. Such verification checks may include a variety of heuristics designed to prevent crime or fraud, as known to those of ordinary skill in the art. The particular heuristics used may vary depending upon the specific practical implementation of the present invention, and may depend upon the level of security and crime prevention desired, any applicable regulatory requirements, and other relevant factors.

The authorization step 560 typically includes sending instructions to a financial or other institution to permit the withdrawal of a designated amount of funds, in a particular currency unit, from an account. In embodiments, this account is a corporate disbursement account that permits disbursements to any intended Recipient who provides a first string (e.g., a Cash Card Number 350) and a second string (e.g., a Transfer PIN 130) that pass the comparison tests of steps 530 and 550 depicted in FIG. 9. In other words, in embodiments of the present invention, the Cash Card Number 350 (and the PIN Card Number 150) are not associated with a separate account for each user. Thus, unlike a disbursement made from a specific user account (e.g., a withdrawal from a specific bank account associated with an individual or predetermined group of users), a disbursement in embodiments of the present invention is made from an account that is available to one or more unrelated users—that is, users who do not share a familial, organizational, business or other pre-existing trust or financial relationship.

In the embodiment depicted in FIG. 9, after authorization system 140 has authorized the disbursement, the authorization instruction is also sent, in step 570, to the dispensing unit. In embodiments of the present invention, as discussed above, the Sender has purchased a PIN Card 160 in a convenient increment of whole currency units of currency used at the intended Recipient's location. This facilitates the dispensing of cash in response to an authorization instruction, since the dispensing unit thus needs to retain and dispense fewer denominations of currency. In embodiments, the intended Recipient may only receive the full amount purchased by the Sender and associated with the Transfer PIN 130. In other embodiments, the intended Recipient may signal the dispensing unit that only a portion of the value associated with the Transfer PIN 130 is to be withdrawn during a particular transaction. In such cases, appropriate modifications would be made to the steps depicted in FIG. 9 so that, assuming that the applicable first-string and second-string comparison tests were met, only the requested portion of the initial or remaining value associated with the Transfer PIN would be authorized for disbursement.

It should be noted that, while automatic dispensing units are envisioned as providing a straightforward way to implement the present invention, other dispensing units such as tellers or kiosks could be used. Furthermore, a value transfer according to the present invention does not necessarily entail cash. Other methods of transferring value, such as crediting a bank account, issuing a check, or issuing a debit card, are encompassed within the scope of the invention.

Figure 10:
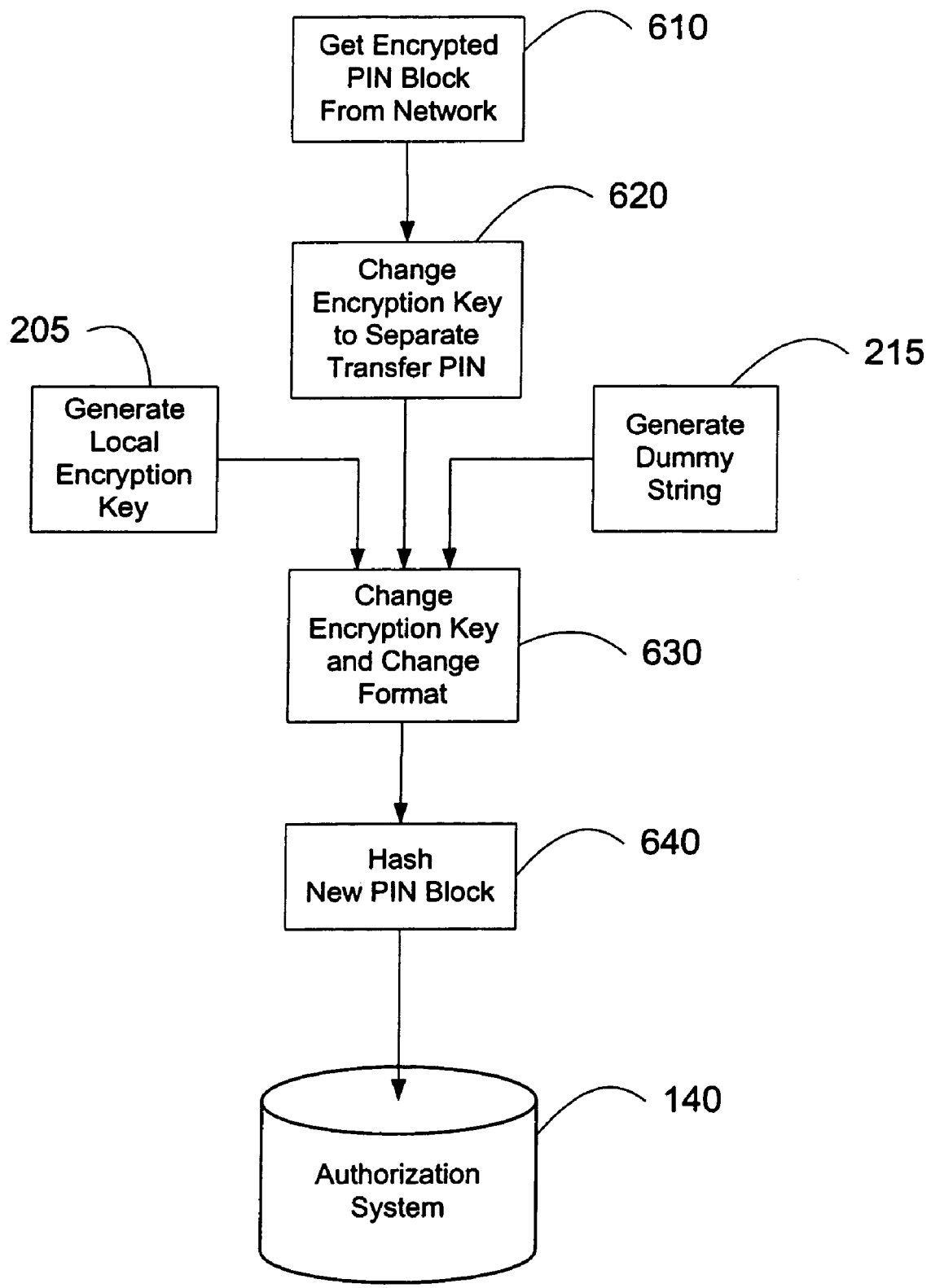
FIG. 10 depicts a process for looking up a Transfer PIN to authorize a funds disbursement in accordance with the present invention.

FIG. 10 illustrates an embodiment of a preferred PIN lookup process to authorize a disbursement as outlined above with respect to FIG. 9. This process translates the PIN block received from the communications network 57 (shown in FIG. 2) into the same format as was stored in the authorization system 140, as described above with respect to FIG. 6. In this embodiment, when the dispensing unit receives a Transfer PIN 130 and a Cash Card Number 350, the communications network 57, which in this example includes the preexisting financial or banking networks and devices connected thereto, combines the Cash Card Number 350 and the Transfer PIN 130 and encrypts the result, transmitting it as one data or PIN block. In step 610, this encrypted PIN block is received from the network by the authorization system 140. In step 620, the authorization system 140 performs a translation using a key, separating an encrypted version of the Transfer PIN 130 from the Cash Card Number 350. In step 630, the encrypted version of the Transfer PIN 130 is translated using a local encryption key, generated in step 205 discussed above with respect to FIG. 6, and a dummy string, generated in step 215 discussed above with respect to FIG. 6, to a format equivalent to that which is used to store the Transfer PINs 130 in a database in the authorization system 140 (as discussed above with respect to FIG. 6). In step 640, the encrypted Transfer PINs 130 that are the result of step 630 are hashed, facilitating comparison with the Transfer PINs 130 stored in the authorization system 140 as described above with respect to FIG. 6. The authorization system 140 thereby compares the Transfer PIN 130 entered by a Recipient with the stored values of Transfer PINs 130 by comparing encrypted versions of Transfer PINs 130. The Transfer PINs 130 are not transmitted or compared in "clear," non-encrypted format, thereby enhancing the security of the Transfer PINs 130 used in accordance with embodiments of the current invention.

An advantageous aspect of the present invention is that it can easily be used to run promotions, sweepstakes, and the like, designed to enhance customer loyalty, including to a money transfer system implemented in accordance with the present invention. In accordance with this aspect of the present invention, a PIN is publicly advertised. The publicly advertised PIN may preferably comprise 4 characters, but other lengths may be used. Cash Card 310 or PIN Card 160 holders, or both, are encouraged to visit appropriate units and enter the publicly advertised PIN to see if they are eligible for promotional cash giveaways. FIG. 11 provides a flow chart of an embodiment of this aspect of the present invention. For purposes of simplicity, this embodiment is described with reference to a Cash Card 310 holder; it will be readily understood how the embodiment can be used and adapted for PIN Card 160 holders.

In the embodiment depicted in FIG. 11, in steps 710 and 720, a Cash Card 310 holder provides a dispensing unit with a first string (e.g., a Cash Card Number 350) and a second string which, in this embodiment, is the publicly advertised PIN. These steps correspond to steps 510 and 520 of FIG. 9, as described above. In the embodiment depicted in FIG. 11, at step 730 the authorization system 140 compares the first string to active first-string values (for example as described with reference to step 530 of FIG. 9). If the comparison tests of step 730 are successfully met, the holder of the Cash Card 310 is identified in step 735. This embodiment thus contemplates that, as described above with respect to FIG. 7, identifying information about the Cash Card 310 holder will be obtained, for example when the Cash Card is distributed, and associated with the Cash Card Number 350 in a database available to the authorization system 140. If the comparison tests of step 730 are not met, then appropriate messages are sent to the user in step 750, including messages to try again or that the transaction has been terminated.

At step 740 of the embodiment depicted in FIG. 11, comparison tests of the second string are conducted in step 740 (for example as described in detail with reference to step 550 of FIG. 9). If a valid second string is entered, the authorization system 140 identifies the second string as being associated with a sweepstakes promotion, as opposed to a money transfer transaction. If the comparison tests of step 740 are met, the user is authorized in step 745. If the comparison tests of step 740 are not met, then, as with step 730, appropriate messages are sent to the user in step 750, including messages to try again or that the transaction has been terminated.

Once the user is identified in step 735 and is authorized in step 745, processing proceeds to step 760 of FIG. 11. In that step, the authorization system 140 checks whether the particular Cash Card 310 meets predetermined criteria in connection with the sweepstakes or promotion. For example, the predetermined criteria may be based on the historical usage pattern of the Cash Card 310, such as whether the Cash Card 310 was used within a specified time period, whether the Cash Card 310 was used a specified number of times within a specified time period, or whether a Cash Card 310 was used in relation to transactions over a certain amount. In other implementations, the predetermined criteria may be based on promotional rules including an intentional Cash Card 310 activation event, such as the first time a Cash Card 310 is used, or the number of times a Cash Card 310 is used within a specified promotional time period. Such an intentional Cash Card 310 activation event may be independent of the historical usage pattern of the Cash Card 310. In a sweepstakes fashion, the promotional rules may incorporate an activation event that is unpredictable to the Cash Card 310 holder, for example where one in every fifty, or every hundred users is automatically dispensed a predetermined amount of cash in accordance with the desired promotion.

If the Cash Card 310 user meets predetermined criteria, a disbursement is authorized in step 770 of FIG. 11, and the authorization is sent to a dispensing unit in step 780, enabling the Cash Card 310 holder to obtain the identified disbursement. Should the Cash Card user not meet predetermined criteria, or if either the Cash Card Number 350 or entered PIN do not match expected values, then the transaction is terminated in step 750, as discussed above.

Unlike in the cash transfer process discussed above in relation to FIG. 9, in the promotional embodiment described with references to FIG. 11, the Cash Card Number 350 read by the dispensing unit and transmitted to the authorization system may be important to the decision of whether to authorize a cash disbursement. In a promotional embodiment of the present invention, the PIN entered by the user may be publicly known, and the disbursement authorization decision is based on the identification of the particular Cash Card 310 being used. This is in contrast to the embodiment of cash transfer process discussed with respect to FIG. 9 in which the disbursement authorization decision was based on the Transfer PIN 130 and was independent of the particular Cash Card 310 being used, as long as the Cash Card 310 used is active.

The above-described preferred embodiments are intended to illustrate the principles of the invention, but not to limit its scope. Various other embodiments may occur to those skilled in the art upon reading the present disclosure or practicing the claimed invention. Such variations, modifications, and equivalents are intended to come within the scope of the invention and the appended claims.

We claim:

1. A card for activating a cash dispensing unit comprising:
    a storage medium, wherein the storage medium stores information comprising a numeric string associated with a disbursement account accessible by a plurality of unrelated users,
    wherein upon insertion of the card into a cash dispensing unit, the numeric string serves to validate the card to conduct a transaction with the disbursement account.
2. The card of claim 1, wherein the storage medium comprises a magnetic stripe.
3. The card of claim 1, wherein the numeric string is not associated with a distinct user account.
4. The card of claim 1, wherein the cash dispensing unit comprises an automated teller machine (ATM).
5. The card of claim 1, wherein the cash dispensing unit comprises a point-of-sale terminal at a retail location.
6. A card for activating a cash dispensing unit comprising:
    a storage medium, wherein the storage medium stores information comprising a numeric string associated with a disbursement account accessible by a plurality of unrelated users,
    wherein, in response to inserting the card into a cash dispensing unit and entering an essentially unique string into the cash dispensing unit, the cash dispensing unit dispenses a predetermined amount of cash associated with the essentially unique string.
7. The card of claim 6, wherein the storage medium comprises a magnetic stripe.
8. The card of claim 6, wherein the numeric string is not associated with a distinct user account.
9. The card of claim 6, wherein the cash dispensing unit comprises an automated teller machine (ATM).
10. The card of claim 6, wherein the cash dispensing unit comprises a point-of-sale terminal at a retail location.

* * * * *